US012672066B2

(12) United States Patent
Xu et al.

(10) Patent No.: US 12,672,066 B2
(45) Date of Patent: Jun. 30, 2026

(54) TECHNIQUES FOR A CONTROL CHANNEL WAKEUP SIGNAL

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/756,003

(22) PCT Filed: Nov. 15, 2019

(86) PCT No.: PCT/CN2019/118902
§ 371 (c)(1),
(2) Date: May 13, 2022

(87) PCT Pub. No.: WO2021/092933
PCT Pub. Date: May 20, 2021

(65) Prior Publication Data
US 2022/0400441 A1 Dec. 15, 2022

(51) Int. Cl.
*H04W 52/02* (2009.01)
*H04W 72/21* (2023.01)
(Continued)

(52) U.S. Cl.
CPC ... *H04W 52/0235* (2013.01); *H04W 52/0219* (2013.01); *H04W 72/21* (2023.01);
(Continued)

(58) Field of Classification Search
CPC ......... H04W 52/0235; H04W 52/0219; H04W 72/21; H04W 72/23; H04W 74/0875;
(Continued)

(56) References Cited

U.S. PATENT DOCUMENTS

| | | | | |
|---|---|---|---|---|
| 9,872,252 B1 * | 1/2018 | Ang | ...................... | H04W 72/20 |
| 11,564,170 B2 * | 1/2023 | Zhang | ................... | H04W 72/23 |

(Continued)

FOREIGN PATENT DOCUMENTS

| | | |
|---|---|---|
| CN | 109548054 A | 3/2019 |
| CN | 109792364 A | 5/2019 |

(Continued)

OTHER PUBLICATIONS

International Search Report and Written Opinion—PCT/CN2019/118902—ISA/EPO—Aug. 7, 2020.
(Continued)

*Primary Examiner* — Atique Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a wakeup signal (WUS) associated with a discontinuous reception (DRX) ON duration; determine that a grant was not detected in the DRX ON duration; and perform an action based at least in part on whether the WUS is specific to the UE or is associated with a group of UEs. Numerous other aspects are provided.

29 Claims, 9 Drawing Sheets

(51) Int. Cl.

| | |
|---|---|
| *H04W 72/23* | (2023.01) |
| *H04W 74/08* | (2009.01) |
| *H04W 74/0808* | (2024.01) |
| *H04W 76/28* | (2018.01) |

(52) U.S. Cl.

CPC ....... *H04W 72/23* (2023.01); *H04W 74/0808* (2013.01); *H04W 74/0875* (2013.01); *H04W 76/28* (2018.02)

(58) Field of Classification Search

CPC .............. H04W 76/28; H04W 72/123; H04W 52/0229; H04W 52/02; H04W 74/0808

See application file for complete search history.

(56) References Cited

U.S. PATENT DOCUMENTS

| | | | | |
|---|---|---|---|---|
| 2008/0192703 | A1 | 8/2008 | Suzuki | |
| 2014/0247743 | A1* | 9/2014 | Seo ...................... | H04W 48/16 |
| | | | | 370/252 |
| 2016/0286603 | A1 | 9/2016 | Vajapeyam et al. | |
| 2017/0094543 | A1* | 3/2017 | Narasimha ........... | H04B 17/318 |
| 2017/0311322 | A1* | 10/2017 | Kim ...................... | H04W 24/10 |
| 2018/0132292 | A1* | 5/2018 | Yang .................... | H04W 76/18 |
| 2019/0215781 | A1 | 7/2019 | Jeon et al. | |
| 2019/0281504 | A1 | 9/2019 | Su et al. | |
| 2019/0349856 | A1 | 11/2019 | Liu et al. | |
| 2019/0363843 | A1* | 11/2019 | Gordaychik .......... | H04W 28/16 |
| 2020/0112917 | A1* | 4/2020 | Nam ..................... | H04W 72/23 |
| 2020/0112919 | A1* | 4/2020 | Nam ..................... | H04L 5/001 |
| 2020/0163017 | A1* | 5/2020 | Priyanto .............. | H04W 88/04 |
| 2021/0195521 | A1* | 6/2021 | Müller ................. | H04W 76/28 |
| 2021/0289582 | A1* | 9/2021 | Bergstrom ............ | H04L 1/1829 |
| 2021/0314866 | A1 | 10/2021 | Lee et al. | |
| 2021/0329470 | A1* | 10/2021 | Shen ..................... | H04W 24/08 |
| 2021/0368445 | A1* | 11/2021 | Xu ........................ | H04W 80/02 |
| 2022/0060305 | A1* | 2/2022 | Ijaz ...................... | H04L 5/0082 |
| 2022/0132422 | A1* | 4/2022 | Zhou .................... | H04L 5/0053 |
| 2022/0174741 | A1* | 6/2022 | Myung ............. | H04W 74/0866 |
| 2022/0240182 | A1* | 7/2022 | Baldemair ........ | H04W 52/0229 |
| 2022/0338178 | A1* | 10/2022 | Kuang ............. | H04W 52/0229 |
| 2024/0147362 | A1* | 5/2024 | Thyagarajan ..... | H04W 52/0229 |

FOREIGN PATENT DOCUMENTS

| | | | | |
|---|---|---|---|---|
| WO | WO-2018125686 | A2 * | 7/2018 | ........ H04W 52/0264 |
| WO | 2018204799 | A1 | 11/2018 | |
| WO | 2018208956 | A1 | 11/2018 | |
| WO | 2019017751 | A1 | 1/2019 | |
| WO | 2019190205 | A1 | 10/2019 | |

OTHER PUBLICATIONS

Qualcomm Incorporated: "Efficient Monitoring of DL Control Channels", 3GPP TSG RAN WG1 Meeting #92bis, R1-1804914, Sanya, China, Apr. 16-20, 2018, pp. 1-13, Apr. 6, 2018 (Apr. 6, 2018) section 6.2.6.3.

Supplementary Partial European Search Report—EP19952301—Search Authority—The Hague—Jun. 30, 2023.

Supplementary European Search Report—EP19952301—Search Authority—The Hague—Oct. 2, 2023.

Qualcomm Incorporated: "Maintenance for CSI Reporting," R1-1803243, 3GPP TSG RAN WG1 Meeting #92, Feb. 26-Mar. 2, 2018, Athens, Greece, 12 pages, The Whole Document.

* cited by examiner

610 — Receive a wakeup signal (WUS) associated with a discontinuous reception (DRX) ON duration 620 — Determine that a grant was not detected in the DRX ON duration 630 — Perform an action based at least in part on whether the WUS is specific to the UE or is associated with a group of UEs

600

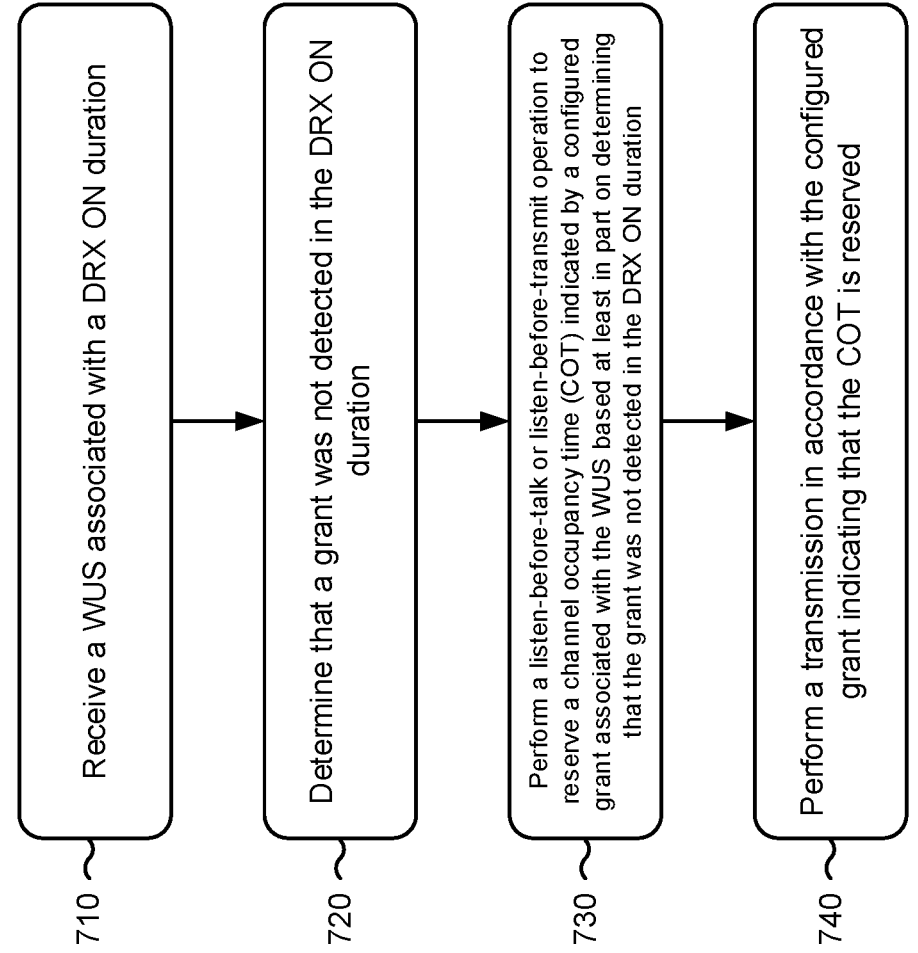

710 — Receive a WUS associated with a DRX ON duration

720 — Determine that a grant was not detected in the DRX ON duration

730 — Perform a listen-before-talk or listen-before-transmit operation to reserve a channel occupancy time (COT) indicated by a configured grant associated with the WUS based at least in part on determining that the grant was not detected in the DRX ON duration 740 — Perform a transmission in accordance with the configured grant indicating that the COT is reserved

810   Receive a WUS associated with a DRX ON duration

820   Determine that a grant was not detected in the DRX ON duration

830   Perform an action based at least in part on whether a COT-SI is detected associated with the DRX ON duration

800

TECHNIQUES FOR A CONTROL CHANNEL WAKEUP SIGNAL

CROSS-REFERENCE TO RELATED APPLICATION

This application is a 371 national stage of Patent Cooperation Treaty (PCT) Application No. PCT/CN2019/118902 filed on Nov. 15, 2019, entitled "TECHNIQUES FOR A CONTROL CHANNEL WAKEUP SIGNAL," which is hereby expressly incorporated by reference herein.

FIELD OF THE DISCLOSURE

Aspects of the present disclosure generally relate to wireless communication and to techniques and apparatuses for a control channel wakeup signal (WUS).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a WUS associated with a DRX ON duration; determining that a grant was not detected in the DRX ON duration; and performing an action based at least in part on whether the WUS is specific to the UE or is associated with a group of UEs.

In some aspects, the UE is configured with information indicating whether the WUS is specific to the UE or is associated with a group of UEs.

In some aspects, performing the action is based at least in part on a configuration of the UE that indicates that the action is to be performed based at least in part on the WUS being received and the UE determining that the grant was not detected.

In some aspects, the action comprises waking up in at least one of the DRX ON duration or at least one subsequent DRX ON duration.

In some aspects, the action comprises waking up for a subsequent DRX ON duration irrespective of whether a WUS associated with the subsequent DRX ON duration is received.

In some aspects, waking up in the subsequent DRX ON duration after the DRX ON duration, irrespective of whether the WUS associated with the subsequent DRX ON duration is detected, is based at least in part on a configuration received by the UE indicating that the UE is to wake up in the subsequent DRX ON duration after the DRX ON duration irrespective of whether the WUS associated with the subsequent DRX ON duration is detected.

In some aspects, alone or in combination with one or more of the first through fifth aspects, the action comprises performing a transmission in accordance with a configured grant.

In some aspects, a method of wireless communication, performed by a UE, may include receiving a WUS associated with a DRX ON duration; determining that a grant was not detected in the DRX ON duration; performing a listen-before-talk operation to reserve a channel occupancy time (COT) indicated by a configured grant associated with the WUS, based at least in part on determining that the grant was not detected in the DRX ON duration; and performing a transmission indicating that the COT is reserved.

In some aspects, the COT is subsequent to the DRX ON duration.

In some aspects, the transmission includes a zero-padded uplink shared channel based at least in part on the UE having no uplink data to transmit during the COT.

In some aspects, the transmission includes an indication that the zero-padded uplink shared channel is zero-padded.

In some aspects, the transmission includes only an uplink control channel and a reference signal.

In some aspects, the transmission includes only the uplink control channel based at least in part on the transmission being associated with a front-loaded reference signal.

In some aspects, the WUS includes configuration information for the transmission.

In some aspects, the WUS includes channel access priority class information for a channel clear assessment associated with the transmission.

In some aspects, the WUS includes a radio resource control parameter for the transmission.

In some aspects, alone or in combination with one or more of the first through eighth aspects, the transmission indicates that the COT is shared with a base station.

In some aspects, alone or in combination with one or more of the first through ninth aspects, the method includes receiving a downlink transmission from the base station based at least in part on the transmission.

In some aspects, a method of wireless communication, performed by a UE, may include receiving a WUS associated with a DRX ON duration; determining that a grant was not detected in the DRX ON duration; and performing an action based at least in part on whether a COT system information (COT-SI) is detected associated with the DRX ON duration.

In some aspects, when the COT-SI is detected associated with the DRX ON duration, the action comprises a baseline behavior associated with determining that the grant was not detected in the DRX ON duration.

In some aspects, when the COT-SI is not detected associated with the DRX ON duration, the action comprises waking up in a subsequent DRX ON duration after the DRX ON duration, irrespective of whether a WUS associated with the subsequent DRX ON duration is detected.

In some aspects, the COT-SI is configured in connection with the DRX ON duration.

In some aspects, the COT-SI is not configured in connection with the DRX ON duration.

In some aspects, the UE is configured to wake up in one or more DRX ON durations, after receiving the WUS, until the UE receives the grant or the COT-SI is detected.

In some aspects, a UE for wireless communication may include memory and one or more processors operatively coupled to the memory. The memory and the one or more processors may be configured to receive a WUS associated with a DRX ON duration; determine that a grant was not detected in the DRX ON duration; and perform an action based at least in part on whether the WUS is specific to the UE or is associated with a group of UEs.

In some aspects, a UE for wireless communication may include memory and one or more processors operatively coupled to the memory. The memory and the one or more processors may be configured to receive a WUS associated with a DRX ON duration; determine that a grant was not detected in the DRX ON duration; perform a listen-before-talk operation to reserve a COT indicated by a configured grant associated with the WUS based at least in part on determining that the grant was not detected in the DRX ON duration; and perform a transmission indicating that the COT is reserved.

In some aspects, a UE for wireless communication may include memory and one or more processors operatively coupled to the memory. The memory and the one or more processors may be configured to receive a WUS associated with a DRX ON duration; determine that a grant was not detected in the DRX ON duration; and perform an action based at least in part on whether a COT-SI is detected associated with the DRX ON duration.

In some aspects, a non-transitory computer-readable medium may store one or more instructions for wireless communication. The one or more instructions, when executed by one or more processors of a UE, may cause the one or more processors to: receive a WUS associated with a DRX ON duration; determine that a grant was not detected in the DRX ON duration; and perform an action based at least in part on whether the WUS is specific to the UE or is associated with a group of UEs.

In some aspects, a non-transitory computer-readable medium may store one or more instructions for wireless communication. The one or more instructions, when executed by one or more processors of a UE, may cause the one or more processors to: receive a WUS associated with a DRX ON duration; determine that a grant was not detected in the DRX ON duration; perform a listen-before-talk operation to reserve a COT indicated by a configured grant associated with the WUS based at least in part on determining that the grant was not detected in the DRX ON duration; and perform a transmission indicating that the COT is reserved.

In some aspects, a non-transitory computer-readable medium may store one or more instructions for wireless communication. The one or more instructions, when executed by one or more processors of a UE, may cause the one or more processors to: receive a WUS associated with a DRX ON duration; determine that a grant was not detected in the DRX ON duration; and perform an action based at least in part on whether a COT-SI is detected associated with the DRX ON duration.

In some aspects, an apparatus for wireless communication may include means for receiving a WUS associated with a DRX ON duration; means for determining that a grant was not detected in the DRX ON duration; and means for performing an action based at least in part on whether the WUS is specific to the apparatus or is associated with a group of UEs.

In some aspects, an apparatus for wireless communication may include means for receiving a WUS associated with a DRX ON duration; means for determining that a grant was not detected in the DRX ON duration; means for performing a listen-before-talk operation to reserve a COT indicated by a configured grant associated with the WUS based at least in part on determining that the grant was not detected in the DRX ON duration; and means for performing a transmission indicating that the COT is reserved.

In some aspects, an apparatus for wireless communication may include means for receiving a WUS associated with a DRX ON duration; means for determining that a grant was not detected in the DRX ON duration; and means for performing an action based at least in part on whether a COT-SI is detected associated with the DRX ON duration.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-8 are diagrams illustrating example processes performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
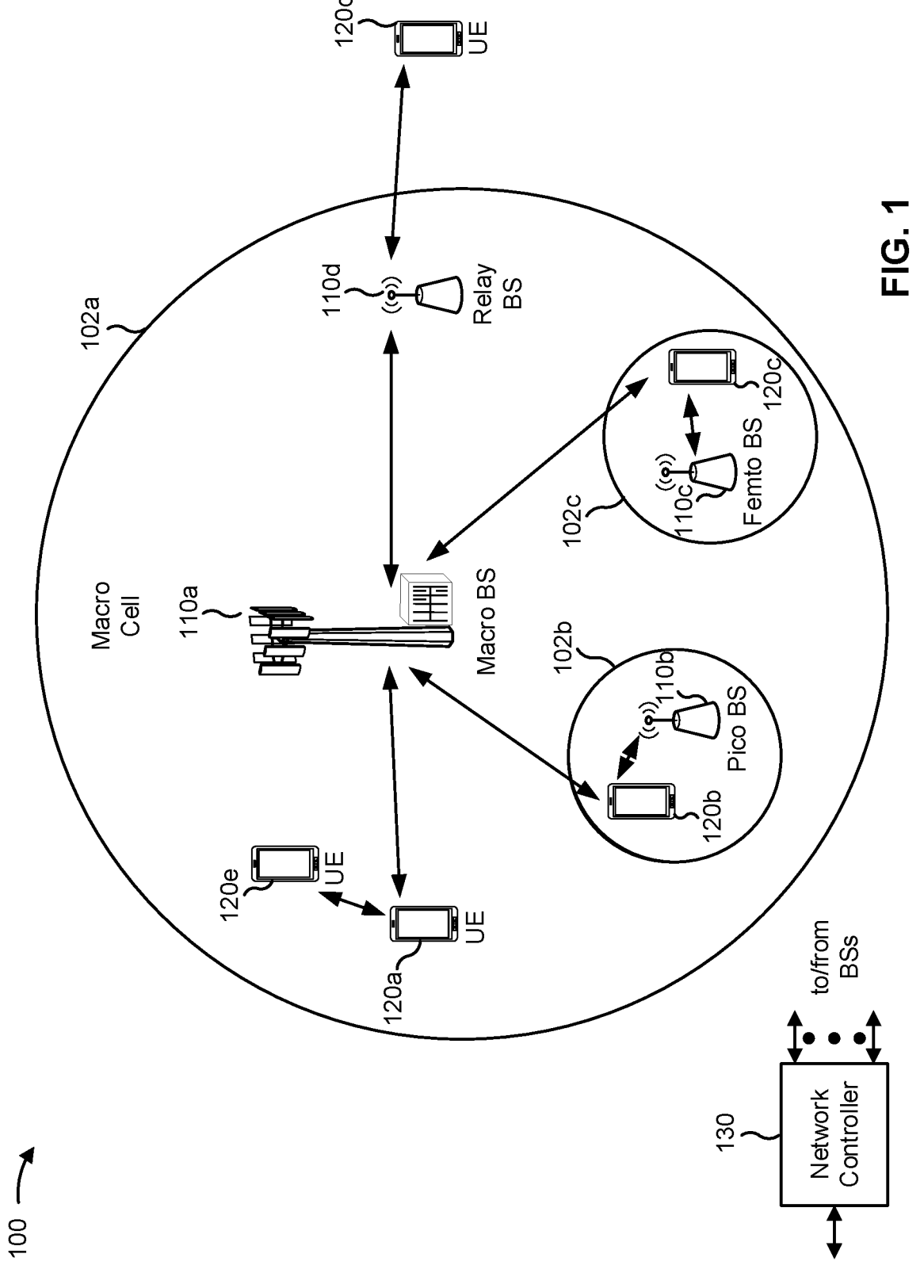
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
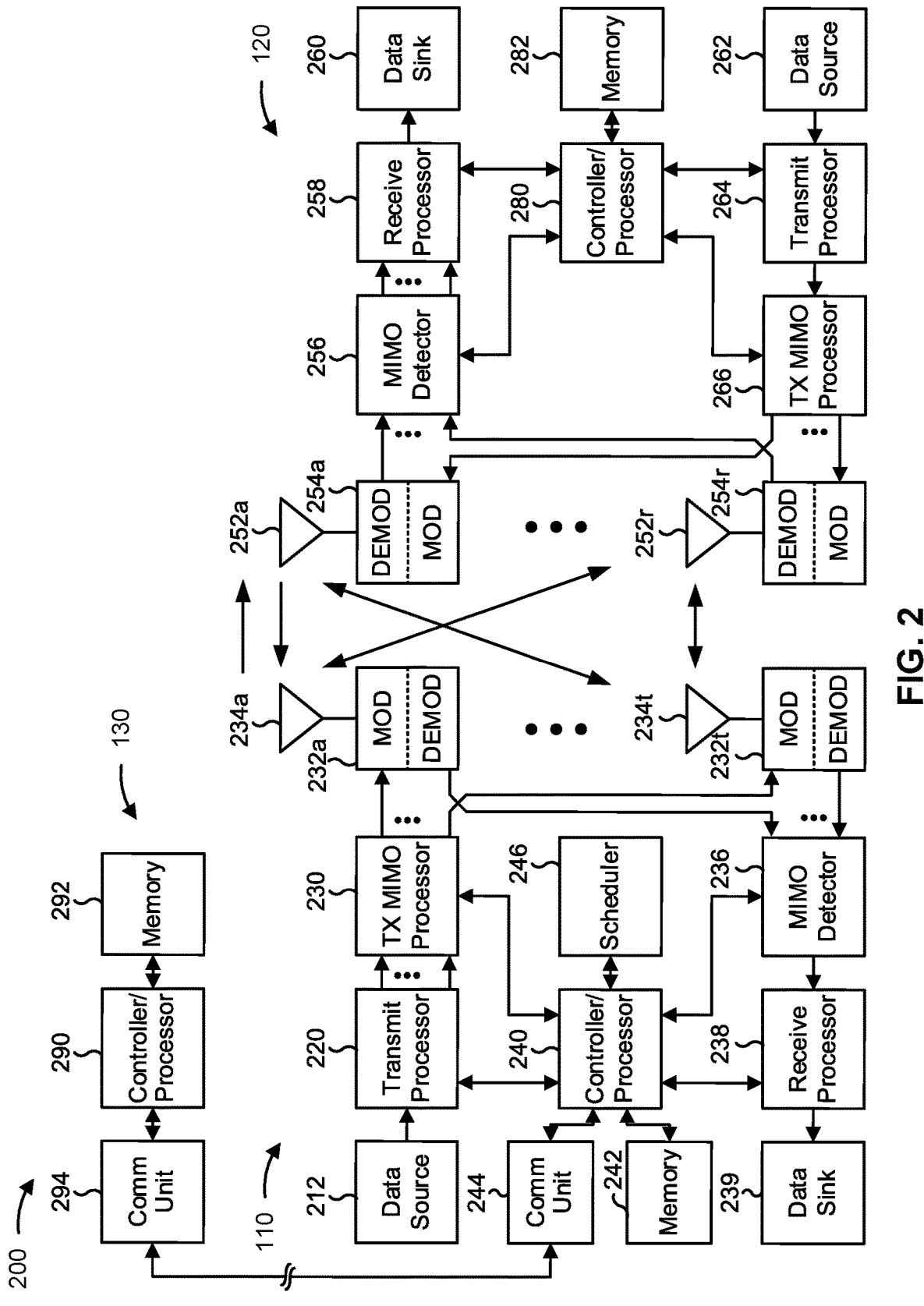
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a control channel wakeup signal (WUS), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, UE 120 may include means for receiving a WUS associated with a discontinuous reception (DRX) ON duration; means for determining that a grant was not detected in the DRX ON duration; means for performing an action based at least in part on whether the WUS is specific to the UE or is associated with a group of UEs; means for performing a listen-before-talk operation to reserve a channel occupancy time (COT) indicated by a configured grant associated with the WUS based at least in part on determining that the grant was not detected in the DRX ON duration; means for performing a transmission according to the configured grant indicating that the COT is reserved; means for receiving a downlink transmission from the base station based at least in part on the transmission; means for performing an action based at least in part on whether a COT Structure Indication (COT-SI) is detected associated with the DRX ON duration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may use a WUS in connection with a DRX cycle, such as a connected-mode DRX (C-DRX) cycle, to reduce power consumption of the UE. For example, in a C-DRX cycle, the UE may enter a sleep mode (e.g., a low power state) in between DRX ON durations of the C-DRX cycle. The UE may wake up in each DRX ON duration and monitor for a grant. If the UE receives a grant in a DRX ON duration, the UE may perform a communication in accordance with the grant. If the UE does not receive a grant, then the UE may return to the sleep mode until a next DRX ON duration. The WUS may be transmitted in a time window preceding a corresponding DRX ON duration, and may indicate whether the UE is to receive a grant in the corresponding DRX ON duration. For example, the UE may wake up for a DRX ON duration only if the UE receives a WUS corresponding to the DRX ON duration, and may remain in the sleep mode if the UE does not receive a WUS corresponding to the DRX ON duration. Thus, the UE may conserve power relative to waking up for all DRX ON durations irrespective of whether the UE will receive a grant in the DRX ON duration.

In some aspects, multiple WUS monitoring occasions can be configured within a slot or in multiple slots before a corresponding DRX ON duration. A downlink control information (DCI) format scrambled by a power saving radio network temporary identifier (PS-RNTI) may be used to provide indications of power saving information (e.g., the WUS) outside of an active time of the UE. This DCI may be designed with UE-specific configured power saving information for one or more UEs, and may support multiplexing of one or more UEs. In other words, a WUS may be UE-specific or may be for a group of UEs. If the UE detects DCI of the DCI format scrambled using the PS-RNTI in the monitoring occasion(s) for a DRX ON duration, the UE may follow an indication of the DCI regarding whether to wake up in the DRX ON duration.

In some aspects, the WUS may be used in unlicensed spectrum. In unlicensed spectrum, a base station may use a listen-before-transmit or listen-before-talk (both abbreviated LBT) operation to determine whether a channel is sufficiently clear for the base station's transmission. For example, the base station may perform the LBT operation before transmitting the WUS and before transmitting a grant in the DRX ON duration corresponding to the WUS. If the LBT operation for the WUS fails, then the BS 110 may retransmit the WUS in another WUS monitoring occasion. However, in some examples, the LBT operation for the WUS may succeed and the LBT operation for the grant may fail. If the LBT operation for the WUS succeeds and the WUS is transmitted, there may be ambiguity at the UE regarding whether to wake up in the DRX ON duration. For example, if the WUS was for a different UE of a group of UEs, then the UE might not expect the grant, whereas if the WUS was for the UE and the LBT operation for the grant failed, then a mitigation action might be appropriate. This ambiguity leads to wasted computing resources associated with monitoring DRX ON durations corresponding to WUSs not directed to a UE and missing grants directed to the UE because of a failed LBT operation.

Some techniques and apparatuses described herein provide actions to be performed in the case when a UE detects a WUS and fails to detect a corresponding grant. For example, some techniques and apparatuses described herein provide explicit indication of whether a WUS is UE-specific or associated with a group, and/or configuration of actions to be performed when the UE receives a WUS and does not receive a corresponding grant. Some techniques and apparatuses described herein provide indication of whether a WUS is associated with a UE based at least in part on a channel occupancy time system information (COT-SI) received in the corresponding DRX ON duration, and actions to be performed based at least in part on whether the UE receives the COT-SI. Some techniques and apparatuses described herein provide for the UE to occupy a COT using a configured grant and receive a transmission from the base station using COT sharing. In this way, computing resources may be conserved that would otherwise be used to monitor DRX ON durations that correspond to a WUS that is not directed to the UE. Furthermore, negative impacts associated with missed grants are reduced or eliminated (e.g., throughput may be improved, traffic may not be missed, and/or the like).

Figure 3:
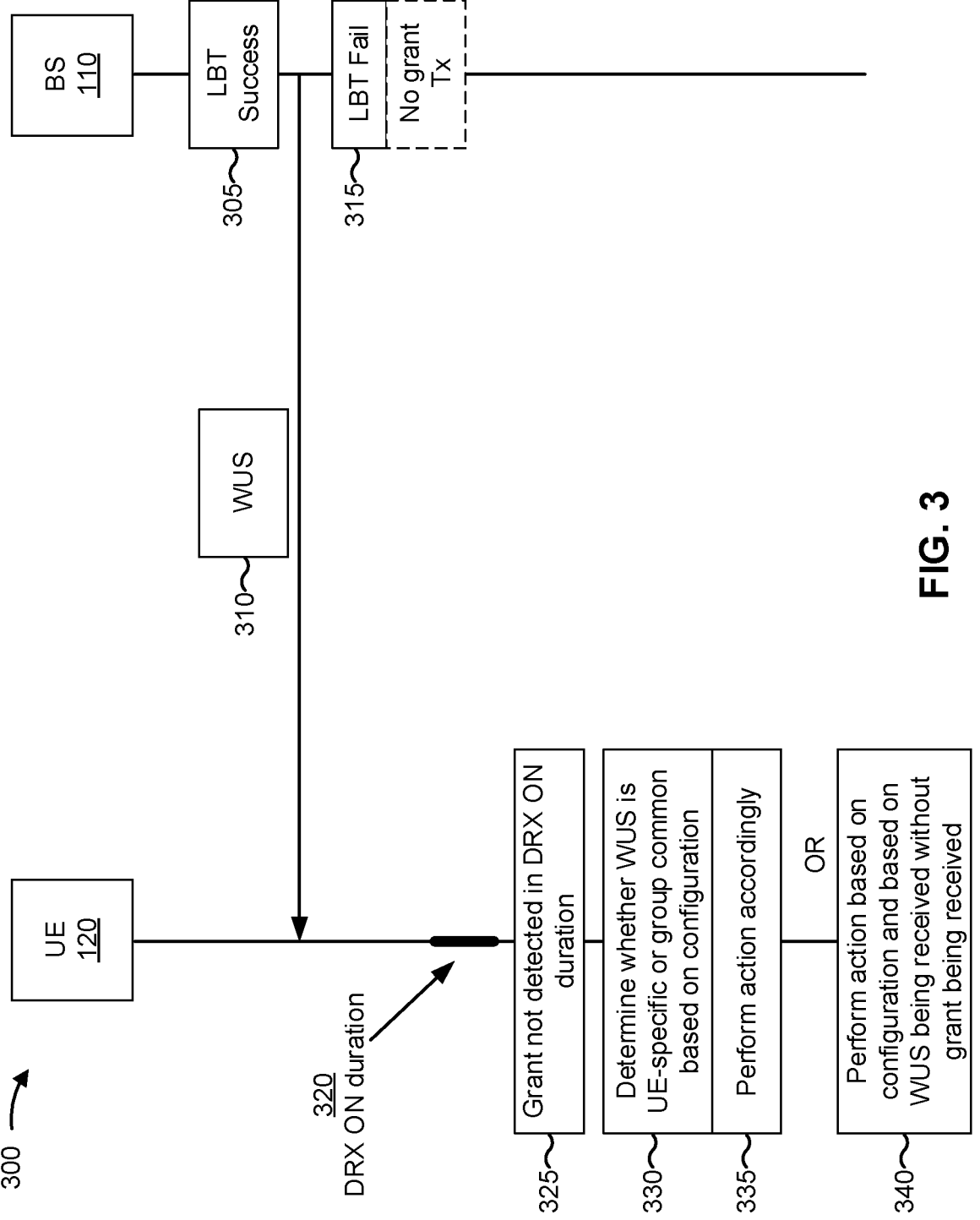
FIG. 3 is a diagram illustrating an example 300 of determination of whether a WUS is a UE-specific WUS or a group common WUS, in accordance with various aspects of the present disclosure.

FIG. 3 is a diagram illustrating an example 300 of determination of whether a WUS is a UE-specific WUS or a group common WUS, in accordance with various aspects of the present disclosure. As shown, example 300 includes a UE 120 and a BS 110.

As shown by reference number 305, the BS 110 may perform an LBT operation for transmission of a WUS, shown by reference number 310. Since the LBT operation is successful, the BS 110 transmits the WUS. The WUS may indicate, to a UE 120, that the UE 120 is to monitor a corresponding DRX ON duration for a grant. In some aspects, the WUS may be directed to a single UE 120 that is to monitor the DRX ON duration. This may be referred to as a UE-specific WUS. In some aspects, the WUS may be directed to a group of UEs that are to monitor the DRX ON duration. This may be referred to as a group common WUS. A group common WUS directed to a group of UEs may indicate that a grant is to be transmitted for one or more UEs of the group of UEs. In other words, a group common WUS may not necessarily be directed to all UEs of a group of UEs. If the UE 120 receives a WUS and not a corresponding grant, then it may benefit the UE 120 to determine whether the WUS is a group common WUS (indicating that the grant may have been directed to another UE 120 and thus was correctly not received by the UE 120) or a UE-specific WUS (indicating that the UE 120 missed a grant directed to the UE 120). The UE 120 may use the techniques described below in connection with reference numbers 330, 335, and/or 340 to determine whether the WUS is a UE-specific WUS or a group common WUS and perform an action accordingly.

Figure 4:
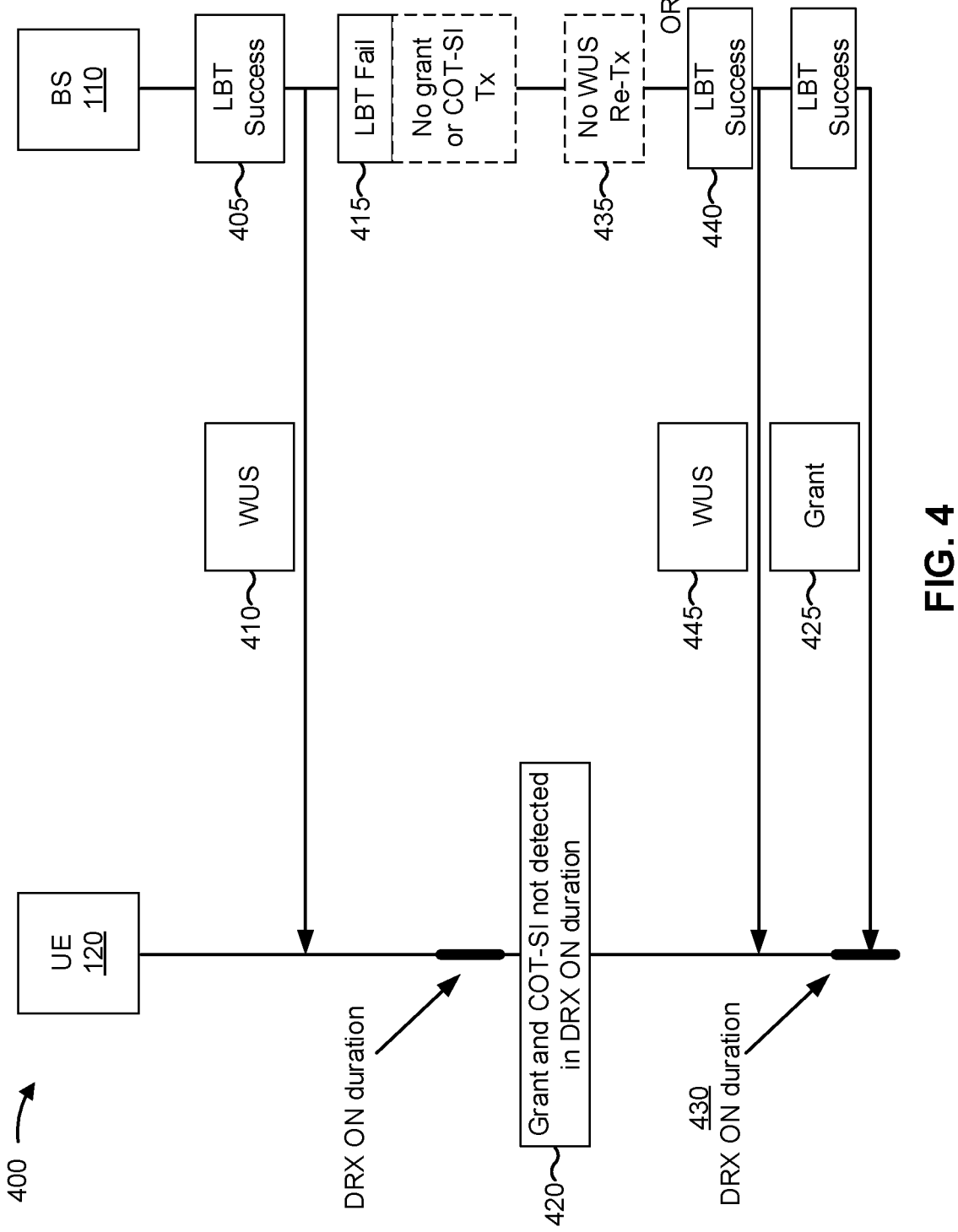
FIG. 4 is a diagram illustrating an example 400 of determination of mitigation of a listen-before-talk (LBT) operation failure for a grant using a COT-SI, in accordance with various aspects of the present disclosure.
Figure 5:
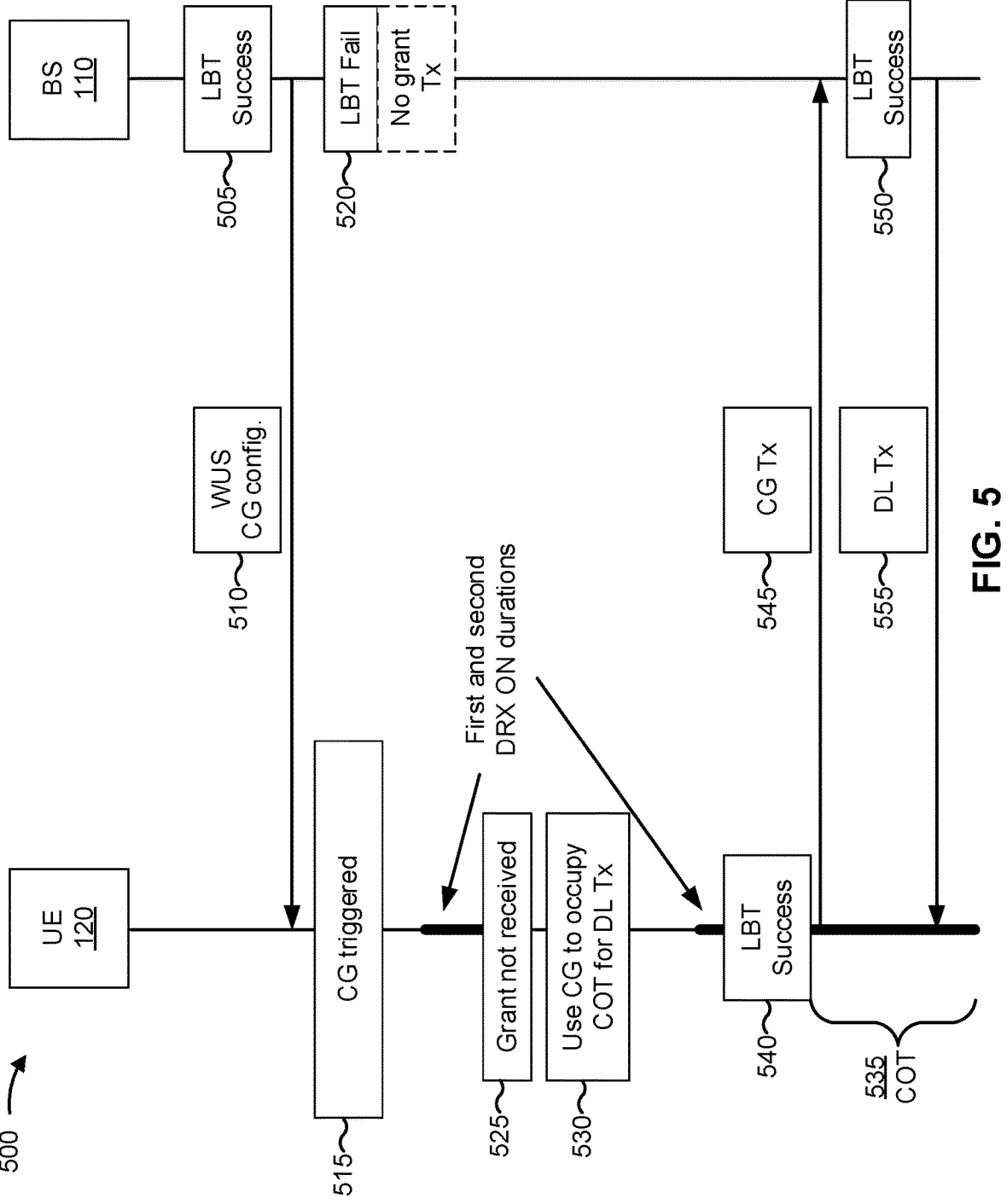
FIG. 5 is a diagram illustrating an example 500 of occupying a COT on behalf of a base station using a configured grant based at least in part on failing to detect a grant in a DRX ON duration, in accordance with various aspects of the present disclosure.

As shown by reference number 315, the BS 110 may fail an LBT operation for a grant associated with the WUS. Accordingly, the BS 110 may not transmit the grant during a DRX ON duration 320 corresponding to the WUS. In FIGS. 3-5, dashed lines are used to indicate operations that were not performed, for example, due to a failed LBT operation or for another reason.

As shown by reference number 325, the UE 120 may determine that the grant and COT-SI was not detected in the DRX ON duration. Accordingly, the UE 120 may perform the operations indicated by reference numbers 330 and 335, or the operations indicated by reference number 340. These actions are described in more detail below.

As shown by reference number 330, in some aspects, the UE 120 may determine whether the WUS is a UE-specific WUS or a group common WUS. For example, the UE 120 may perform this determination based at least in part on a field in the WUS. In this case, the UE 120 may receive information explicitly indicating whether the WUS is a group common WUS or a UE-specific WUS. For example, control information (e.g., radio resource control (RRC) information and/or the like) for the WUS may indicate whether the WUS is a group common WUS or a UE-specific WUS.

As shown by reference number 335, the UE 120 may perform an action based at least in part on whether the WUS is a UE-specific WUS or a group common WUS. For example, if the WUS is a UE-specific WUS, the UE 120 may remain awake in order to receive the WUS after the DRX ON duration 320. As another example, if the WUS is a UE-specific WUS, the UE 120 may wake up for a next DRX ON duration after the DRX ON duration 320. As yet another example, the UE 120 may perform an action based at least in part on a configured grant (CG), which is described in more detail in connection with FIG. 5. If the WUS is a group common WUS, the UE 120 may determine that the grant was not directed to the UE 120, and may return to a sleep state until a next WUS is received. Determining whether the WUS is a group common WUS may provide increased flexibility in the handling of the WUS, which may conserve computing resources that would otherwise be used handling a group common WUS as a UE-specific WUS or vice versa.

As shown by reference number 340, in some aspects, the UE 120 may be configured with an action to perform in the case of receiving a WUS and not a corresponding grant or COT-SI. For example, the configuration may indicate that, if the UE 120 receives a WUS and not a corresponding grant, the UE 120 is to perform an action (e.g., remaining awake, waking up for a next DRX ON duration, performing a communication using a CG, and/or the like). In some aspects, the UE 120 may be configured to perform this action irrespective of whether the WUS is a group common WUS or a UE-specific WUS. Performing the action irrespective of whether the WUS is a group common WUS or a UE-specific WUS may conserve computing resources that would otherwise be used to determine whether the WUS is a group common WUS or a UE-specific WUS.

As indicated above, FIG. 3 is provided as an example. Other examples may differ from what is described with respect to FIG. 3.

FIG. 4 is a diagram illustrating an example 400 of determination of mitigation of an LBT operation failure for a grant using a COT-SI, in accordance with various aspects of the present disclosure. As shown, example 400 includes a UE 120 and a BS 110. A COT-SI may indicate that the BS 110 has successfully occupied a COT for the purpose of performing a transmission. Here, the COT may be aligned with the DRX ON duration. Therefore, if the UE 120 is configured to receive a COT-SI in the COT and actually receives the COT-SI in the COT, the UE 120 may determine that the BS 110 has occupied the COT and successfully performed a transmission in the DRX ON duration. If the UE 120 is configured to receive the COT-SI in the COT and does not receive the COT-SI in the COT, then the UE 120 may determine that an LBT operation of the BS 110 has failed.

As shown in FIG. 4, and by reference number 405, the BS 110 may successfully perform an LBT operation for a WUS, and may transmit the WUS as shown by reference number 410. As shown by reference number 415, an LBT operation for the WUS in the DRX ON duration may fail. Accordingly, the BS 110 may not transmit a grant or a COT-SI.

As shown by reference number 420, the UE 120 may determine that the grant and the COT-SI are not detected in the DRX ON duration. Thus, the UE 120 may determine that the BS 110 failed to occupy the COT associated with the DRX ON duration, since the failure to detect the COT-SI indicates that the BS 110 failed to occupy the COT associated with the DRX ON duration. In some aspects, when a COT-SI is not configured for the UE 120, the UE 120 may be unable to definitively determine whether the BS 110 has channel access. If the COT-SI is not configured for the UE 120, then the UE 120 may perform the operations described in connection with reference numbers 425, 435, 440, and 445.

If the UE 120 receives a COT-SI in the DRX ON duration, then the UE 120 may determine that the BS 110 successfully occupied the COT associated with the DRX ON duration. Thus, the UE 120 may determine that the grant was not directed to the UE 120, for example, because the WUS was a group common WUS and the grant was directed to another UE of the group other than the UE 120. In this case, the UE 120 may perform a baseline behavior, such as returning to a sleep mode and waiting for a next COT.

The operations described below are described out of temporal order for clarity. As shown by reference number 425, the BS 110 may transmit a grant and/or a COT-SI in connection with a successful LBT operation. For example, the BS 110 may transmit the grant in a subsequent DRX ON duration shown by reference number 430. The grant may be a retransmission of the grant for which transmission failed, as illustrated by reference number 415, or may be a new grant. Thus, the BS 110 may provide the grant to the UE 120 after an original grant transmission fails due to a failure of an LBT operation.

In some aspects, as shown by reference number 435, the BS 110 may not transmit a WUS for the grant shown by reference number 425. For example, the BS 110 may transmit the grant without transmitting a corresponding wakeup signal. In some aspects, the UE 120 may wake up in the DRX ON duration shown by reference number 430 irrespective of whether the WUS associated with the DRX ON duration shown by reference number 430 is received. In other words, the BS 110 may transmit the grant to the UE in the DRX ON duration shown by reference number 430 irrespective of whether an LBT operation for the WUS associated with the DRX ON duration is successful, which may conserve computing and transmission resources that would otherwise be used to transmit the WUS. In some aspects, the UE 120 may wake up in DRX ON durations until one or more of a WUS, a grant, or a COT-SI is received.

In some aspects, as shown by reference number 440, the BS 110 may perform an LBT operation for a COT corresponding to the DRX ON duration shown by reference number 430. As shown by reference number 445, the BS 110 may transmit a WUS for the DRX ON duration shown by reference number 430 based at least in part on the LBT operation being successful, which may improve robustness relative to not transmitting the WUS, and may improve coexistence with other transmitters.

In some aspects, the UE 120 may perform the operations described in connection with reference numbers 435, 440, and 445 based at least in part on determining that the WUS is a UE-specific WUS. For example, the UE 120 may perform the operations described in connection with FIG. 3, may determine that the WUS is a UE-specific WUS, and may receive the grant (e.g., without receiving another WUS or after receiving another WUS) using the operations described in FIG. 4. In some aspects, the UE 120 may be configured to perform the operations described in FIG. 4 irrespective of whether the WUS is a UE-specific WUS or a group common WUS.

As indicated above, FIG. 4 is provided as an example. Other examples may differ from what is described with respect to FIG. 4.

FIG. 5 is a diagram illustrating an example 500 of occupying a COT on behalf of a base station using a CG based at least in part on failing to detect a grant in a DRX ON duration, in accordance with various aspects of the present disclosure. As shown, example 500 includes a UE 120 and a BS 110. The operations described in connection with example 500 relate to a UE 120 using a CG to share a COT with a BS 110. For example, the UE 120 may be configured with a CG. The CG may be associated with a resource within a COT of the UE 120. The UE 120 may reserve the resource, for example, by performing an LBT operation to secure the COT for a transmission of the UE 120. Then, the UE 120 may perform a transmission to the BS 110 indicating that the BS 110 can use the COT, which the UE 120 reserved, for a downlink transmission. This downlink transmission may include a grant for an uplink data transmission or any other form of information to be transmitted by the BS 110. In example 500, the UE 120 may use the CG to secure the COT for a downlink transmission of the BS 110 after the BS 110 fails an LBT operation for a grant, as described below.

As shown in FIG. 5, and by reference number 505, the BS 110 may successfully perform an LBT operation for a WUS. As shown by reference number 510, the BS 110 may transmit the WUS. In some aspects, and as shown, the WUS may include configuration information for a CG. In some aspects, the configuration information may include a flag indicating that the UE 120 is to use the CG to contend for the COT if a grant fails an LBT operation. In some aspects, the configuration information may indicate a channel access priority class (CAPC) for a channel clear assessment (CCA) (e.g., LBT parameters for an LBT operation) for the CG. In some aspects, the configuration information may indicate, for example, a COT sharing offset (e.g., a timing value from the CG to the downlink transmission from the BS 110).

As shown by reference number 515, the CG may be triggered for the UE 120. For example, the WUS may trigger the UE 120 to activate a resource allocation of the CG, described below. As shown by reference number 520, the BS 110 may fail an LBT operation associated with a grant for a first DRX ON duration. Accordingly, the BS 110 may not transmit a grant in the first DRX ON duration. As shown by reference number 525, the UE 120 may determine that the grant was not received in the first DRX ON duration. Accordingly, as shown by reference number 530, the UE 120 may determine to use the CG to occupy a COT 535 for a downlink transmission of the BS 110. Here, the COT 535 overlaps a second DRX ON duration, so the UE 120 will be awake for the COT 535. In some aspects, the UE 120 may determine to use the CG to occupy the COT 535 based at least in part on failing to receive a COT-SI in the first DRX ON duration.

As shown by reference number 540, the UE 120 may successfully perform an LBT operation for the CG. Thus, the UE 120 can occupy the COT 535. As shown by reference number 545, the UE 120 may perform a transmission using the CG based at least in part on occupying the COT 535. The transmission may indicate that the BS 110 can use the COT 535 for a downlink transmission. For example, the transmission may indicate that the COT 535 is shared with the BS 110 and/or may identify a resource for the downlink transmission of the BS 110 that is within the COT 535.

In some aspects, the UE 120 may perform the transmission shown by reference number 545 irrespective of whether the UE 120 has uplink data to transmit. For example, the UE 120 may pad an uplink shared channel of the transmission with zeroes if there is no data to send, which may fill the uplink shared channel as scheduled, thereby preserving the configuration of demodulation reference signals and/or the like. In this case, uplink control information (UCI) of the transmission may indicate that the uplink shared channel is zero-padded (e.g., by using an invalid hybrid automatic repeat request (HARQ) identifier and/or the like). In some aspects, the UE 120 may not transmit an uplink shared channel in the transmission. For example, the transmission may include only an uplink control channel, a reference signal, and/or the like. In some aspects, the UE 120 may not transmit the uplink shared channel based at least in part on the transmission being associated with a front-loaded reference signal such as a front-loaded demodulation reference signal, which may reduce interruption of the reference signal due to the transmission not including the uplink shared channel.

As shown by reference number 550, the BS 110 may successfully perform an LBT operation for a downlink transmission. As shown by reference number 555, the BS 110 may perform the downlink transmission. For example, the downlink transmission may include the grant, a different grant, a data payload, and/or the like. In this way, the UE 120 may occupy the COT 535 using the CG and may provide an indication to the BS 110 to use the COT 535 for the downlink transmission. Thus, the failure to transmit the grant is mitigated, and further failures of the LBT operation by the BS 110 are avoided.

As indicated above, FIG. 5 is provided as an example. Other examples may differ from what is described with respect to FIG. 5.

Figure 6:
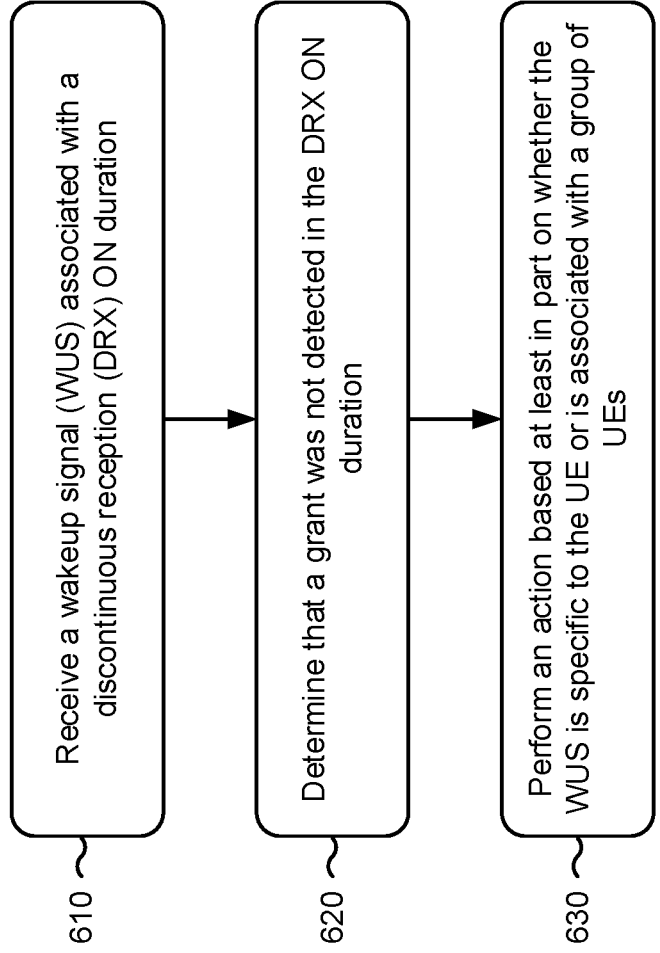

FIG. 6 is a diagram illustrating an example process 600 performed, for example, by a UE, in accordance with various aspects of the present disclosure. Example process 600 is an example where the UE (e.g., UE 120 and/or the like) performs operations associated with a control channel wakeup signal.

As shown in FIG. 6, in some aspects, process 600 may include receiving a wakeup signal (WUS) associated with a discontinuous reception (DRX) ON duration (block 610). For example, the UE (e.g., using antenna 252, DEMOD 254, MIMO detector 256, receive processor 258, controller/processor 280, and/or the like) may receive a WUS associated with a DRX ON duration, as described above.

As further shown in FIG. 6, in some aspects, process 600 may include determining that a grant or COT-SI was not detected in the DRX ON duration (block 620). For example, the UE (e.g., using antenna 252, DEMOD 254, MIMO detector 256, receive processor 258, controller/processor 280, and/or the like) may determine that a grant was not detected in the DRX ON duration, as described above.

As further shown in FIG. 6, in some aspects, process 600 may include performing an action based at least in part on whether the WUS is specific to the UE or is associated with a group of UEs (block 630). For example, the UE (e.g., using antenna 252, DEMOD 254, MIMO detector 256, receive processor 258, controller/processor 280, and/or the like)

may perform an action based at least in part on whether the WUS is specific to the UE or is associated with a group of UEs, as described above.

Process 600 may include additional aspects, such as any single aspect or any combination of aspects described below and/or in connection with one or more other processes described elsewhere herein.

In a first aspect, the UE is configured with information indicating whether the WUS is specific to the UE or is associated with a group of UEs.

In a second aspect, alone or in combination with the first aspect, selectively performing the action is based at least in part on a configuration of the UE that indicates that the action is to be performed based at least in part on the wakeup signal being received and the UE determining that the grant was not detected.

In a third aspect, alone or in combination with one or more of the first and second aspects, the action comprises waking up in at least one of the DRX ON duration or at least one subsequent DRX ON duration.

In a fourth aspect, alone or in combination with one or more of the first through third aspects, the action comprises waking up for a subsequent DRX ON duration irrespective of whether a WUS associated with the subsequent DRX ON duration is received.

In a fifth aspect, alone or in combination with one or more of the first through fourth aspects, waking up in the subsequent DRX ON duration after the DRX ON duration, irrespective of whether the WUS associated with the subsequent DRX ON duration is detected, is based at least in part on a configuration received by the UE indicating that the UE is to wake up in the subsequent DRX ON duration after the DRX ON duration irrespective of whether the WUS associated with the subsequent DRX ON duration is detected.

In a sixth aspect, alone or in combination with one or more of the first through fifth aspects, the action comprises performing a transmission in accordance with a configured grant.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with various aspects of the present disclosure. Example process 700 is an example where the UE (e.g., UE 120 and/or the like) performs operations associated with a control channel wakeup signal.

As shown in FIG. 7, in some aspects, process 700 may include receiving a WUS associated with a DRX ON duration (block 710). For example, the UE (e.g., using antenna 252, DEMOD 254, MIMO detector 256, receive processor 258, controller/processor 280, and/or the like) may receive a WUS associated with a DRX ON duration, as described above.

As further shown in FIG. 7, in some aspects, process 700 may include determining that a grant was not detected in the DRX ON duration (block 720). For example, the UE (e.g., using antenna 252, DEMOD 254, MIMO detector 256, receive processor 258, controller/processor 280, and/or the like) may determine that a grant was not detected in the DRX ON duration, as described above.

As further shown in FIG. 7, in some aspects, process 700 may include performing a listen-before-talk or listen-before transmit operation to reserve a channel occupancy time (COT) indicated by a configured grant associated with the WUS based at least in part on determining that the grant or COT-SI was not detected in the DRX ON duration (block 730). For example, the UE (e.g., using antenna 252, DEMOD 254, MIMO detector 256, receive processor 258, controller/processor 280, and/or the like) may perform a listen-before-talk operation to reserve a channel occupancy time (COT) indicated by a configured grant associated with the WUS based at least in part on determining that the grant was not detected in the DRX ON duration, as described above.

As further shown in FIG. 7, in some aspects, process 700 may include performing a transmission in accordance with the configured grant indicating that the COT is reserved (block 740). For example, the UE (e.g., using controller/processor 280, transmit processor 264, TX MIMO processor 266, MOD 254, antenna 252, and/or the like) may perform a transmission indicating that the COT is reserved, as described above.

Process 700 may include additional aspects, such as any single aspect or any combination of aspects described below and/or in connection with one or more other processes described elsewhere herein.

In a first aspect, the COT is subsequent to the DRX ON duration.

In a second aspect, alone or in combination with the first aspect, the transmission includes a zero-padded uplink shared channel based at least in part on the UE having no uplink data to transmit during the COT.

In a third aspect, alone or in combination with one or more of the first and second aspects, the transmission includes an indication that the zero-padded uplink shared channel is zero-padded.

In a fourth aspect, alone or in combination with one or more of the first through third aspects, the transmission includes only an uplink control channel and a reference signal.

In a fifth aspect, alone or in combination with one or more of the first through fourth aspects, the transmission includes only the uplink control channel based at least in part on the transmission being associated with a front-loaded reference signal.

In a sixth aspect, alone or in combination with one or more of the first through fifth aspects, the WUS includes configuration information for the transmission.

In a seventh aspect, alone or in combination with one or more of the first through sixth aspects, the WUS includes channel access priority class information for a channel clear assessment associated with the transmission.

In an eighth aspect, alone or in combination with one or more of the first through seventh aspects, the WUS includes a radio resource control parameter for the transmission.

In a ninth aspect, alone or in combination with one or more of the first through eighth aspects, the transmission indicates that the COT is shared with a base station.

In a tenth aspect, alone or in combination with one or more of the first through ninth aspects, process 700 includes receiving a downlink transmission from the base station based at least in part on the transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
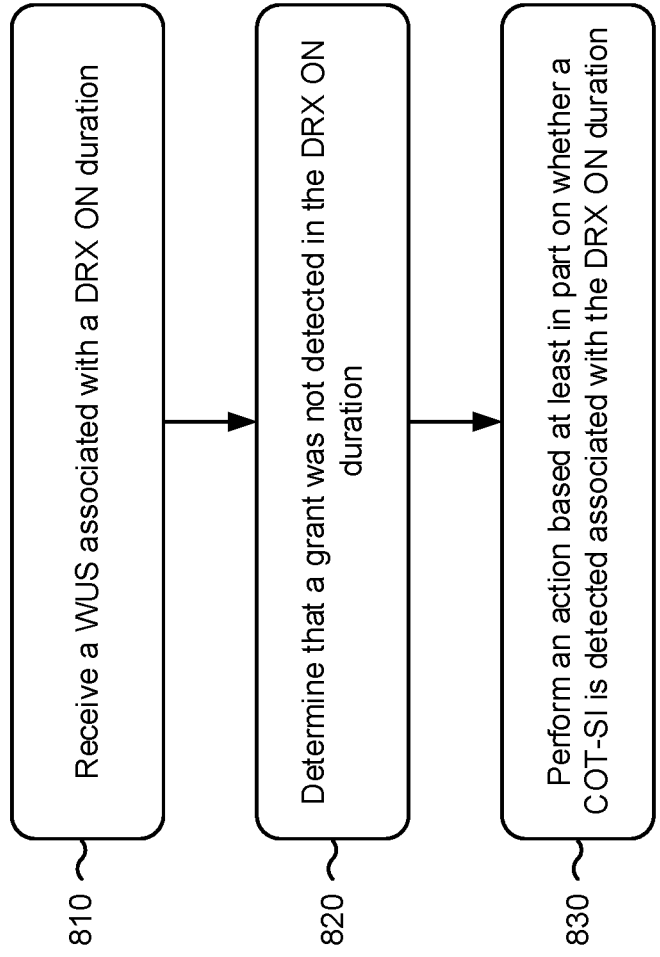

FIG. 8 is a diagram illustrating an example process 800 performed, for example, by a UE, in accordance with various aspects of the present disclosure. Example process 800 is an example where the UE (e.g., UE 120 and/or the like) performs operations associated with a control channel wakeup signal.

As shown in FIG. 8, in some aspects, process 800 may include receiving a WUS associated with a DRX ON duration (block 810). For example, the UE (e.g., using antenna 252, DEMOD 254, MIMO detector 256, receive processor 258, controller/processor 280, and/or the like) may receive a WUS associated with a DRX ON duration, as described above.

As further shown in FIG. 8, in some aspects, process 800 may include determining that a grant was not detected in the DRX ON duration (block 820). For example, the UE (e.g., using antenna 252, DEMOD 254, MIMO detector 256, receive processor 258, controller/processor 280, and/or the like) may determine that a grant was not detected in the DRX ON duration, as described above.

As further shown in FIG. 8, in some aspects, process 800 may include performing an action based at least in part on whether a COT-SI is detected that is associated with the DRX ON duration (block 830). For example, the UE (e.g., using antenna 252, DEMOD 254, MIMO detector 256, receive processor 258, controller/processor 280, and/or the like) may perform an action based at least in part on whether a COT-SI is detected that is associated with the DRX ON duration, as described above.

Process 800 may include additional aspects, such as any single aspect or any combination of aspects described below and/or in connection with one or more other processes described elsewhere herein.

In a first aspect, when the COT-SI is detected associated with the DRX ON duration, the action comprises a baseline behavior associated with determining that the grant was not detected in the DRX ON duration.

In a second aspect, alone or in combination with the first aspect, when the COT-SI is not detected associated with the DRX ON duration, the action comprises waking up in a subsequent DRX ON duration after the DRX ON duration, irrespective of whether a WUS associated with the subsequent DRX ON duration is detected.

In a third aspect, alone or in combination with one or more of the first and second aspects, the COT-SI is configured in connection with the DRX ON duration.

In a fourth aspect, alone or in combination with one or more of the first through third aspects, the COT-SI is not configured in connection with the DRX ON duration.

In a fifth aspect, alone or in combination with one or more of the first through fourth aspects, the UE is configured to wake up in one or more DRX ON durations, after receiving the WUS, until the UE receives the grant or the COT-SI is detected.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
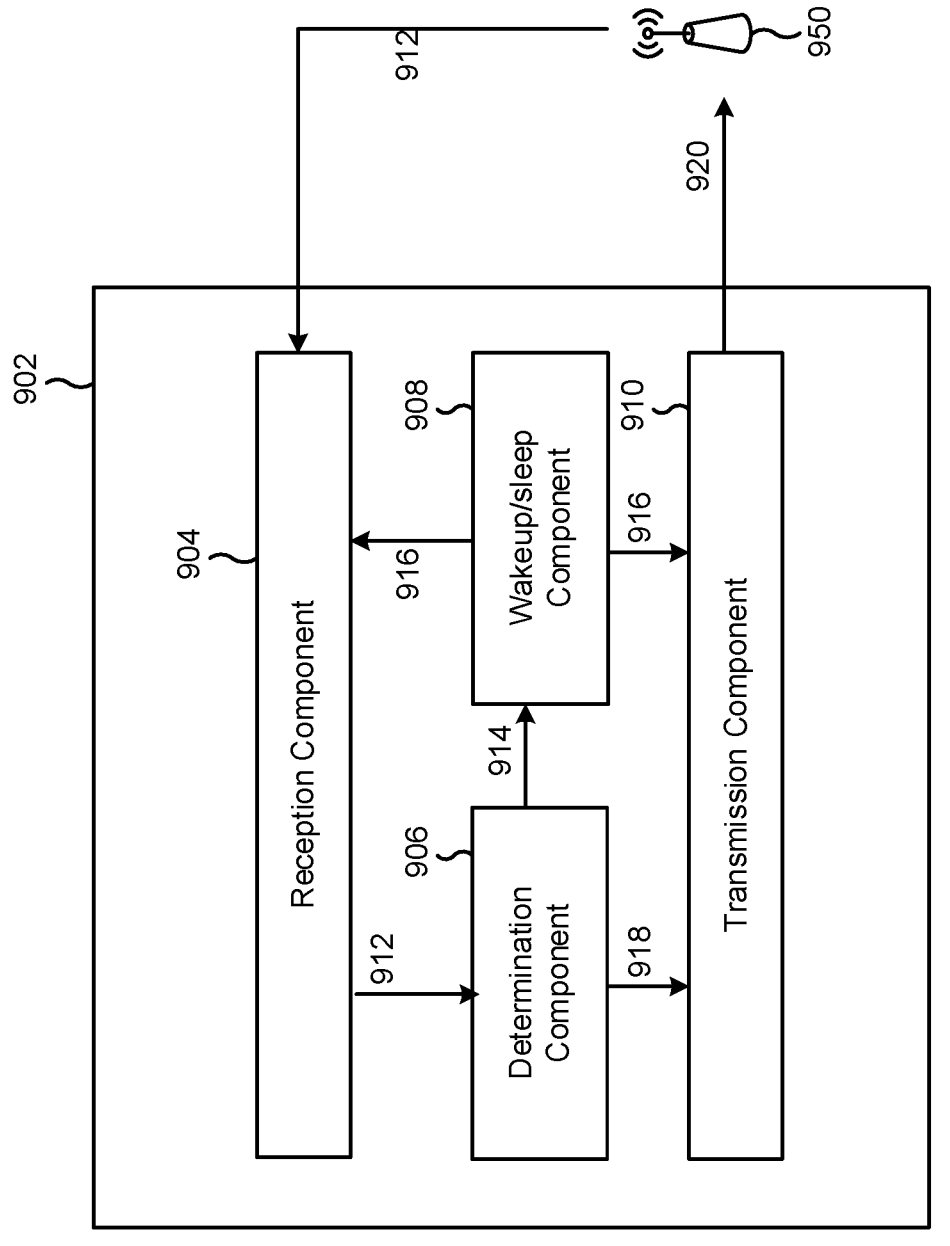
FIG. 9 is a conceptual data flow diagram illustrating data flow between different modules/means/components in an example apparatus, in accordance with various aspects of the present disclosure.

FIG. 9 is a conceptual data flow diagram 900 illustrating data flow between different modules/means/components in an example apparatus 902. The apparatus 902 may be a UE (e.g., UE 120). In some aspects, the apparatus 902 includes a reception component 904, a determination component 906, a wakeup/sleep component 908, and/or a wakeup/sleep component 910.

The reception component 904 may receive signals 912 from a BS 950 (e.g., BS 110). The signals 912 may include, for example, a WUS, a configuration for a CG, a grant, a COT-SI, and/or a downlink transmission. The reception component may provide data 912 to the determination component 906.

The determination component 906 may determine that a grant is not detected in a DRX ON duration based at least in part on the data 912. In some aspects, the determination component 906 may determine that a COT-SI is not detected in a DRX ON duration based at least in part on the data 912. In some aspects, the determination component 906 may determine that a grant and/or a COT-SI was not detected after a WUS is received.

The determination component 906 may control the wakeup/sleep component 908 using signals 914. For example, the wakeup/sleep component 908 may cause the apparatus 902 to wake up or sleep in accordance with a DRX cycle and/or based at least in part on a WUS or a signal 914 from the determination component. In some aspects, the wakeup/sleep component 908 may wake up or power down the transmission component 910 and/or the reception component 904 using signals 916.

The transmission component may transmit signals 920 to the BS 950. In some aspects, the signals 920 may be based at least in part on data 918 from a determination component. In some aspects, the signals 920 may include, for example, a transmission based at least in part on a configured grant, an indication that a COT of the apparatus 902 is shared with the BS 950, and/or the like.

The apparatus 902 may include additional components that perform each of the blocks of the algorithm in the aforementioned process 600 of FIG. 6, process 700 of FIG. 7, process 800 of FIG. 8, and/or the like. Each block in the aforementioned process 600 of FIG. 6, process 700 of FIG. 7, process 800 of FIG. 8, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a wakeup signal (WUS) associated with a discontinuous reception (DRX) ON duration;
   waking up in the DRX ON duration;
   performing a listen-before-talk operation to reserve a channel occupancy time (COT) indicated by a configured grant associated with the WUS based at least in part on determining that a grant was not received from a base station in the DRX ON duration; and
   performing a transmission according to the configured grant indicating that the COT is reserved.

2. The method of claim 1, wherein the COT is subsequent to the DRX ON duration.

3. The method of claim 1, wherein the transmission includes a zero-padded uplink shared channel based at least in part on the UE having no uplink data to transmit during the COT.

4. The method of claim 3, wherein the transmission includes an indication that the zero-padded uplink shared channel is zero-padded.

5. The method of claim 1, wherein the transmission includes only an uplink control channel and a reference signal.

6. The method of claim 5, wherein the transmission includes only the uplink control channel based at least in part on the transmission being associated with a front-loaded reference signal.

7. The method of claim 1, wherein the WUS includes configuration information for the transmission.

8. The method of claim 1, wherein the WUS includes channel access priority class information for a channel clear assessment associated with the transmission.

9. The method of claim 1, wherein the WUS includes a radio resource control parameter for the transmission.

10. The method of claim 1, wherein the transmission indicates that the COT is shared with a base station.

11. The method of claim 10, further comprising:
receiving a downlink transmission from the base station based at least in part on the transmission.

12. A method of wireless communication performed by a user equipment (UE), comprising:
receiving a wakeup signal (WUS) associated with a discontinuous reception (DRX) ON duration;
waking up in the DRX ON duration; and
performing an action based at least in part on determining that a grant was not received from a base station in the DRX ON duration and based at least in part on a determination of whether a channel occupancy time system information (COT-SI) is detected associated with the DRX ON duration.

13. The method of claim 12, wherein, when the COT-SI is detected in the DRX ON duration, the action comprises a baseline behavior associated with determining that the grant was not detected in the DRX ON duration.

14. The method of claim 12, wherein, when the COT-SI is not detected in the DRX ON duration, the action comprises waking up in a subsequent DRX ON duration after the DRX ON duration, irrespective of whether a WUS associated with the subsequent DRX ON duration is detected.

15. The method of claim 12, wherein the COT-SI is configured in connection with the DRX ON duration.

16. The method of claim 12, wherein the COT-SI is not configured in connection with the DRX ON duration.

17. The method of claim 12, wherein the UE is configured to wake up in one or more DRX ON durations, including the DRX ON duration, after receiving the WUS, until the UE receives the grant or the COT-SI is detected.

18. A user equipment (UE) for wireless communication, comprising:
one or more memories; and
one or more processors, coupled to the one or more memories, configured to:
receive a wakeup signal (WUS) associated with a discontinuous reception (DRX) ON duration;
wake up in the DRX ON duration;

perform a listen-before-talk operation to reserve a channel occupancy time (COT) indicated by a configured grant associated with the WUS based at least in part on determining that a grant was not received from a base station in the DRX ON duration; and
perform a transmission according to the configured grant indicating that the COT is reserved.

19. The UE of claim 18, wherein the COT is subsequent to the DRX ON duration.

20. The UE of claim 18, wherein the transmission includes a zero-padded uplink shared channel based at least in part on the UE having no uplink data to transmit during the COT.

21. The UE of claim 20, wherein the transmission includes an indication that the zero-padded uplink shared channel is zero-padded.

22. The UE of claim 18, wherein the transmission includes only an uplink control channel and a reference signal.

23. The UE of claim 22, wherein the transmission includes only the uplink control channel based at least in part on the transmission being associated with a front-loaded reference signal.

24. A user equipment (UE) for wireless communication, comprising:
one or more memories; and
one or more processors, coupled to the one or more memories, configured to:
receive a wakeup signal (WUS) associated with a discontinuous reception (DRX) ON duration;
wake up in the DRX ON duration; and
perform an action based at least in part on determining that a grant was not received from a base station in the DRX ON duration and based at least in part on a determination of whether a channel occupancy time system information (COT-SI) is detected associated with the DRX ON duration.

25. The UE of claim 24, wherein, when the COT-SI is detected in the DRX ON duration, the action comprises a baseline behavior associated with determining that the grant was not detected in the DRX ON duration.

26. The UE of claim 24, wherein, when the COT-SI is not detected in the DRX ON duration, the action comprises waking up in a subsequent DRX ON duration after the DRX ON duration, irrespective of whether a WUS associated with the subsequent DRX ON duration is detected.

27. The UE of claim 24, wherein the COT-SI is configured in connection with the DRX ON duration.

28. The UE of claim 24, wherein the COT-SI is not configured in connection with the DRX ON duration.

29. The UE of claim 24, wherein the UE is configured to wake up in one or more DRX ON durations, including the DRX ON duration, after receiving the WUS, until the UE receives the grant or the COT-SI is detected.

* * * * *